United States Patent
Senn et al.

(10) Patent No.: US 11,771,533 B2
(45) Date of Patent: Oct. 3, 2023

(54) METHOD FOR PRODUCING AN ARTIFICIAL GINGIVA

(71) Applicant: SIRONA DENTAL SYSTEMS GMBH, Bensheim (DE)

(72) Inventors: Marc Senn, Schafthausen (CH); Thomas Oskam, Schafthausen (CH)

(73) Assignee: DENTSPLY SIRONA INC., York, PA (US)

(*) Notice: Subject to any disclaimer, the term of this patent is extended or adjusted under 35 U.S.C. 154(b) by 751 days.

(21) Appl. No.: 16/624,467

(22) PCT Filed: Jul. 3, 2018

(86) PCT No.: PCT/EP2018/067983
§ 371 (c)(1),
(2) Date: Dec. 19, 2019

(87) PCT Pub. No.: WO2019/007976
PCT Pub. Date: Jan. 10, 2019

(65) Prior Publication Data
US 2020/0107916 A1    Apr. 9, 2020

(30) Foreign Application Priority Data
Jul. 3, 2017  (DE) .......................... 102017211249.2

(51) Int. Cl.
*A61C 13/01* (2006.01)
*A61C 13/00* (2006.01)
(Continued)

(52) U.S. Cl.
CPC .......... *A61C 13/04* (2013.01); *A61C 13/0004* (2013.01); *A61C 13/0019* (2013.01);
(Continued)

(58) Field of Classification Search
CPC . A61C 13/04; A61C 13/0004; A61C 13/0019; A61C 13/34; A61C 13/0006;
(Continued)

(56) References Cited

U.S. PATENT DOCUMENTS

| | | | |
|---|---|---|---|
| 5,120,229 A * | 6/1992 | Moore | G09B 23/283 434/74 |
| 5,873,721 A * | 2/1999 | Willoughby | A61C 8/0048 433/172 |
| 9,877,814 B2 | 1/2018 | Schnitzspan | |

FOREIGN PATENT DOCUMENTS

| | | |
|---|---|---|
| DE | 102006026776 A1 | 12/2007 |
| DE | 102007025164 A1 | 12/2008 |

(Continued)

OTHER PUBLICATIONS

International Search Report; PCT/EP2018/067983; Jan. 21, 2019 (completed); dated Feb. 5, 2019.
(Continued)

*Primary Examiner* — Rick K Chang
(74) *Attorney, Agent, or Firm* — DENTSPLY SIRONA INC.

(57) ABSTRACT

The invention relates to a method for producing an artificial gingiva, in which a 3D model of the artificial gingiva is already provided. A gingiva template representing at least partial areas of the 3D model of the artificial gingiva is constructed as a negative mold using the 3D model of the artificial gingiva.

12 Claims, 2 Drawing Sheets

(51) Int. Cl.
  *A61C 13/34* (2006.01)
  *B33Y 80/00* (2015.01)
  *B29C 33/38* (2006.01)
  *B29L 31/00* (2006.01)

(52) U.S. Cl.
  CPC .......... *A61C 13/34* (2013.01); *B29C 33/3835* (2013.01); *B29C 33/3842* (2013.01); *B33Y 80/00* (2014.12); *B29L 2031/757* (2013.01)

(58) Field of Classification Search
  CPC ............ A61C 13/0018; A61C 13/0013; B29C 33/3835; B29C 33/3842; B33Y 80/00; B29L 2031/757
  See application file for complete search history.

(56) References Cited

FOREIGN PATENT DOCUMENTS

| | | |
|---|---|---|
| DE | 102014118231 B3 | 5/2016 |
| DE | 102014215103 B4 | 2/2017 |
| EP | 2322115 A1 | 5/2011 |
| EP | 2389891 A2 | 11/2011 |
| EP | 2499990 A1 | 9/2012 |
| EP | 3064170 A1 | 9/2016 |
| EP | 3087948 A1 | 11/2016 |
| WO | 2013120955 A1 | 8/2013 |

OTHER PUBLICATIONS

International Preliminary Report on Patentability; PCT/EP2018/067983; Jan. 21, 2019 (completed); dated Feb. 5, 2019.
Written Opinion of the International Searching Authority; PCT/EP2018/067983; Jan. 21, 2019 (completed); dated Feb. 5, 2019.

\* cited by examiner

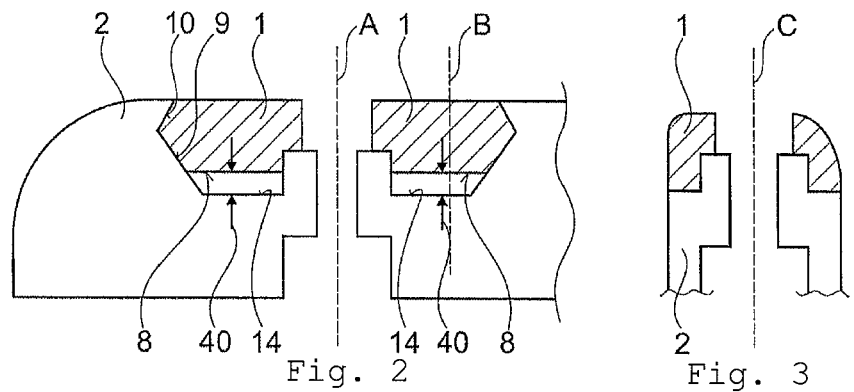
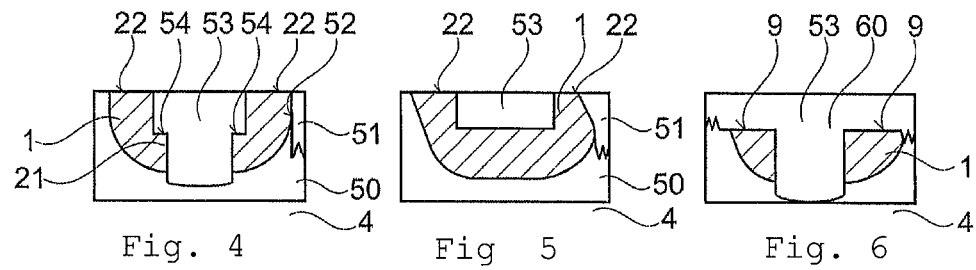
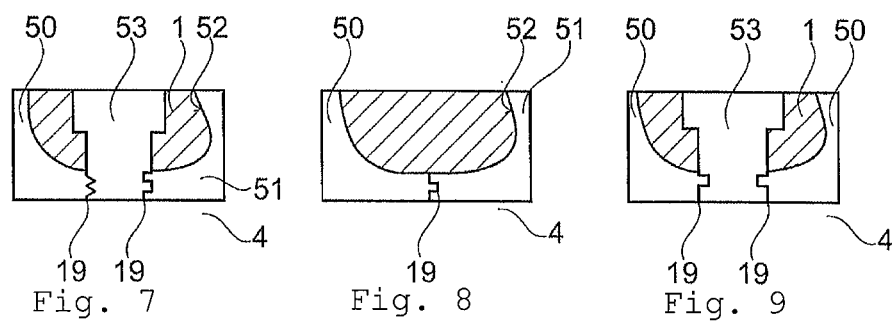
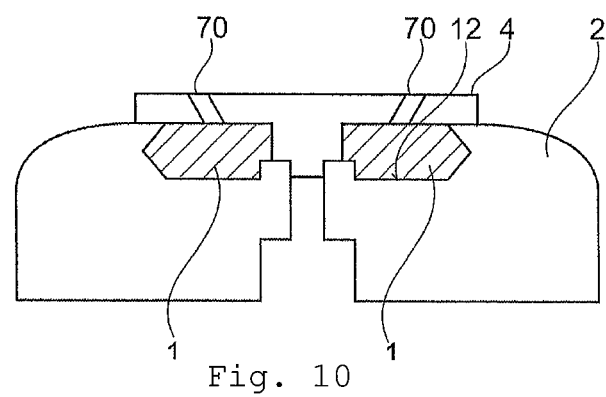

METHOD FOR PRODUCING AN ARTIFICIAL GINGIVA

TECHNICAL FIELD

The invention relates to a method for producing an artificial gingiva, in which a 3D model of the artificial gingiva is already provided.

BACKGROUND OF THE INVENTION

Methods for producing an artificial gingiva are already known in the state of the art.

DE 10 2014 215 103 B4 discloses a method for the virtual post-processing of a virtual artificial gingiva, wherein the virtual 3D model of the artificial gingiva is processed in a targeted manner using a virtual tool.

EP3087948A1 discloses a method for constructing a dental prosthesis consisting of an artificial gingiva and artificial teeth, wherein the artificial gingiva is constructed and produced using a CAD/CAM system. Teeth are then inserted into the artificial gingiva.

EP2322115A1 discloses a method for constructing a dental prosthesis consisting of artificial gingiva and artificial teeth, wherein a 3D model of the artificial gingiva is adapted to the adjacent structures, such as the jaw bone and the teeth.

WO 2013/120955 A1 discloses a method for constructing a dental prosthesis consisting of artificial gingiva and artificial teeth, wherein the virtual artificial teeth are arranged in relation to the virtual model of the gingiva.

One disadvantage of the known methods is that the artificial gingiva is produced using a CAD/CAM system, for example, or manually by a dental technician. The artificial gingiva is made of a flexible material intended to simulate natural gums. Consequently, production errors can occur, as a result of which the produced artificial gingiva deviates from the constructed 3D model of the artificial gingiva.

The object of the present invention is therefore to produce an artificial gingiva in a simple manner with a high degree of automation.

SUMMARY OF THE INVENTION

The invention relates to a method for producing an artificial gingiva, in which a 3D model of the artificial gingiva is already provided. A gingiva template representing at least partial areas of the 3D model of the artificial gingiva is constructed as a negative mold using the 3D model of the artificial gingiva.

An artificial gingiva can be made of a soft elastic material such as silicone, whereby the intent is to mimic the properties of natural gums. The artificial gingiva can be colored pink, for example, to mimic the natural color of a natural gingiva. An artificial gingiva can be used in a dental model of a dental situation, for example to plan an implant restoration of a dental situation.

According to the present method, the 3D model of the artificial gingiva has already been constructed. The gingiva template representing at least partial areas of the 3D model is then constructed as a negative mold using the 3D model. The gingiva template can subsequently be used to produce the artificial gingiva. The gingiva template can consist of at least one part.

One advantage of this method is that the gingiva template is made of a hard, non-elastic material, so that the artificial gingiva can be produced by injecting silicone into the gingiva template, for example. As a result, the dimensions of the cured produced gingiva correspond to the planned 3D model.

The gingiva template can advantageously be constructed from at least two parts, whereby the parts of the gingiva template are constructed in such a way that they can be connected to one another using connecting means.

The at least two parts can consequently be put together to form the gingiva template. The connecting means can be plug connections, for example, that can be snapped together in the manner of Lego blocks.

The artificial gingiva to be produced can advantageously comprise at least one implant recess for at least one implant analog.

The artificial gingiva therefor comprises at least one implant recess for an implant analog. The artificial gingiva can also comprise two or three implant recesses having different orientations.

In the construction of the gingiva template, it is advantageously possible to construct different surfaces, namely non-critical surfaces, bearing surfaces and undercut surfaces.

The non-critical surfaces are surfaces that can be produced with a high degree of error tolerance, because they do not come into contact with an internal structure of the dental model when being inserted into the dental model.

Bearing surfaces are surfaces with a low degree of error tolerance that rest against the internal structure of the dental model when the artificial gingiva is inserted into the dental model. The undercut surfaces of the artificial gingiva comprise undercuts relative to an insertion direction.

The gingiva template can advantageously be constructed manually by a user using a computer, whereby at least one non-critical surface, at least one undercut surface relative to an insertion direction of the artificial gingiva to be produced and/or at least one bearing surface are defined.

The individual types of surfaces are thus constructed by the user with the aid of a computer. The user can use different virtual tools to define the individual surfaces. The insertion direction of the artificial gingiva to be produced can be defined by the orientation of the cylindrical implant recess, for example, and/or as the axis of symmetry of the hill-shaped surface of the artificial gingiva.

The gingiva template can advantageously be constructed fully automatically using a computer, whereby at least one non-critical surface, at least one undercut surface relative to an insertion direction of the artificial gingiva to be produced and/or at least one bearing surface are defined.

The individual types of surfaces are thus constructed fully automatically using the computer. The at least one non-critical surface corresponding to a lower surface of the artificial gingiva can be defined, whereby the lower surface of the artificial gingiva is at a distance from the internal structure of the dental model and thus does not rest against it. The non-critical surfaces can be used as injection channels in the gingiva template. In the second step, at least one bearing surface that rests against the internal structure of the dental model can be defined. In the third step, the at least one undercut surface can be defined relative to the insertion direction on at least one undercut. A second undercut surface can correspondingly be defined on a second undercut.

The construction of the gingiva template is thus fully automatic with knowledge of the 3D model of the artificial gingiva, so that the time of construction of the gingiva template is reduced.

At least one additional, separable part of the gingiva template can advantageously be constructed for each undercut surface.

At least one additional part of the gingiva template is therefore constructed for each undercut surface, so that the individual parts can be separated to remove the cured artificial gingiva.

In the case of very small undercuts, it may be expedient not to construct an additional, separable part of the gingiva template, because the material of the artificial template is elastic enough to be removed from the gingiva template despite the small undercut.

An additional separable part of the gingiva template can advantageously be constructed for each implant recess of the artificial gingiva to be produced.

Therefore, as the negative, the additional separable part can correspondingly have a cylindrical shape of the implant recess for inserting the implant analog. The individual assembled parts of the gingiva template can then be separated to remove the cured artificial gingiva.

The at least one non-critical surface of the gingiva template to be produced can advantageously be used as an injection channel for injecting a gingiva material.

The material, such as silicone, can, for example, be injected with the aid of a syringe. Using the at least one non-critical surface as an injection channel therefore allows a movement of the syringe with numerous degrees of freedom. The user can then reach every corner of the gingiva template with the syringe, thus preventing the occurrence of air bubbles during injection.

The at least one part of the constructed gingiva template can advantageously be produced using a subtractive manufacturing method, such as a CAM machine, or by using an additive manufacturing method, such as a 3D printer.

For production using a CAM machine, a blank is clamped into the CAM machine and processed by means of milling tools and/or grinding tools until the respective part of the constructed gingiva template is produced. When using a 3D printer, the respective part of the gingiva template is printed. The 3D printer can be based on an SLS method (selective laser sintering), for example, which allows the printing of three-dimensional objects without binding agents or additional assembly steps. The existing 3D model of the object to be produced is broken down into numerous horizontal planes by means of special slicing software and passed on to the 3D printer as control commands. The 3D printer then prints the object layer by layer, whereby individual powder particles in a powder bed are fused together with a high temperature of the laser. The object is then lowered and a new powder layer is applied. The process is repeated until the entire three-dimensional object is completely printed. The 3D printer can also be based on a stereolithography method, in which a laser is used to polymerize a mass composed of photosensitive resin and material particles. The material of the gingiva template to be produced can be a hard plastic or ceramic.

A dental model having a corresponding internal structure for inserting the artificial gingiva can advantageously be constructed manually by a user or fully automatically using a computer, whereby the constructed dental model is produced using a subtractive manufacturing method, such as a CAM machine, or using an additive manufacturing method, such as a 3D printer.

With knowledge of the visible surface of the dental model and the internal structure of the dental model, the dental model is thus constructed fully automatically as a negative of the internal structure of the artificial gingiva. The dental model is then produced fully automatically according to a constructed 3D model of the dental model. This reduces the time of construction and the production of the dental model.

A gingiva material, such as silicone, can advantageously be introduced into the produced gingiva template and cured.

This produces an artificial gingiva that mimics the elasticity and color of a natural gingiva and more closely matches the dimensions of the constructed 3D model of the artificial gingiva.

Excess material of the cured artificial gingiva at least one injection channel can advantageously be trimmed off the produced artificial gingiva manually or automatically using a cutting device.

The excess material can therefore be trimmed off the cured artificial gingiva manually by a user or automatically using a cutting device. The cutting device can, for example, be a blade that is driven by an electric motor and controlled accordingly to trim off the excess material at the injection channel. The automatic cutting device makes a firmly defined cutting edge possible.

The cured artificial gingiva can advantageously be removed from the gingiva template.

In the last production step, the artificial gingiva is removed from the gingiva template. If the gingiva template consists of multiple parts, the individual parts can be separated from one another to facilitate the removal of the cured artificial gingiva.

The invention further relates to an artificial gingiva produced using the abovementioned method, wherein the gingiva template is produced in one piece, or in multiple parts and assembled using connecting means, wherein a gingiva material is introduced into the gingiva template and cured and the produced artificial gingiva is removed from the gingiva template.

One advantage of the artificial gingiva produced according to the abovementioned method, is that the dimensions of the cured artificial gingiva correspond to the constructed 3D model of the gingiva.

An additional advantage is that the artificial gingiva can be produced fully automatically according to the abovementioned method, thus reducing the time of production and preventing production errors that can occur during manual production.

The artificial gingiva can advantageously comprise at least one non-critical surface, at least one bearing surface and/or at least one undercut surface.

As the negative of the gingiva template, the artificial gingiva thus likewise comprises a non-critical surface, at least one bearing surface and/or at least one undercut surface.

The artificial gingiva can advantageously be made of a gingiva material, such as silicone.

Silicone provides the desired elasticity and coloration to mimic the natural gingiva as closely as possible.

The invention further relates to a gingiva template for producing an artificial gingiva, in which a 3D model of the artificial gingiva is already provided. First, using the 3D model of the artificial gingiva, the gingiva template is constructed which represents at least partial areas of the 3D model of the artificial gingiva as a negative mold, whereby the at least one part of the produced gingiva template is produced using a subtractive manufacturing method, such as a CAM machine, or using an additive manufacturing method, such as a 3D printer.

One advantage of the gingiva template is therefore that the gingiva template can be constructed fully automatically with knowledge of the 3D model of the artificial gingiva as a negative mold and then produced.

This reduces the time of production of the gingiva template and prevents construction and production errors that can occur when the gingiva template is produced manually.

The gingiva template can advantageously be constructed and produced in at least two parts, whereby the parts of the gingiva template can be mechanically connected to one another using connecting means, such as plug connections.

The gingiva template is thus assembled from at least two parts, whereby the connecting means can be plug connections in the manner of Lego blocks, for example. The plug connections are thus connected to one another purely mechanically, which results in a form fitting connection and/or a frictional connection.

The gingiva template can advantageously be constructed and produced in one piece, whereby the material of the gingiva template has a high degree of brittleness, so that, after the artificial gingiva has cured, the gingiva template can be broken manually by the user to remove the artificial gingiva.

The material used can be a PMMA plastic, for example. The material has to have low elasticity or dimensional stability, as well as a high degree of brittleness. The one-piece gingiva template can alternatively be provided with fracture points, so that the gingiva template can be broken apart after the artificial gingiva has cured.

The gingiva template can advantageously comprise at least one non-critical surface, at least one bearing surface and/or at least one undercut surface.

The artificial gingiva is thus produced with the desired surfaces using the gingiva template.

At least one additional, separable part of the gingiva template can advantageously be produced for each undercut surface.

The additional separable part of the gingiva template can thus be separated in order to remove the cured artificial gingiva from the gingiva template.

An additional separable part of the gingiva template can advantageously be produced for at least one implant recess of the artificial gingiva to be produced.

As a result, a separable part is produced for each implant recess, which facilitates the separation of the gingiva template after the artificial gingiva has cured.

The at least one non-critical surface of the gingiva template can advantageously be used as an injection channel for injecting a gingiva material.

Since the entire non-critical surface serves as an injection channel, the syringe with the gingiva material can be moved freely to facilitate access to the corners of the gingiva templates. Any air bubbles occurring during injection can thus be prevented.

The gingiva template can advantageously be made of a template material, such as a hard plastic.

This prevents unwanted deformation of the gingiva template, so that the artificial gingiva corresponds to the dimensions of the constructed 3D model after curing.

The gingiva template can advantageously comprise a bar having at least one bearing surface.

The bar can be constructed as part of the internal structure of the gingiva template in order to ensure a flat bearing surface. In the dental model for inserting the artificial gingiva, the bar is constructed and produced with the same dimensions, so that the artificial gingiva rests on the bearing surface on the bar. The bearing surface on the bar thus prevents the elastic artificial gingiva from bending during insertion into the dental model and thus deviating from the constructed 3D model.

The bar can be realized in one piece with the implant recess, so that the bearing surfaces rest on the bar when the artificial gingiva is inserted into the dental model, thus preventing elastic deformation, in particular in the vicinity of the implant recess.

One advantage of this dental model is that the dental model can be constructed and produced fully automatically. This reduces the time of construction and production and prevents production errors that can occur when the gingiva template is produced manually.

The visible surface of the dental model is defined by a constructed 3D model of the dental situation. The internal structure for inserting the artificial gingiva is defined as a negative by the internal structure of the artificial gingiva, whereby, for the non-critical surfaces, a distance is provided between the non-critical surfaces of the artificial gingiva and the internal structure of the dental model.

The invention further relates to a dental model produced using the abovementioned method, in which the internal structure for inserting the artificial gingiva is constructed manually by a user or fully automatically using a computer, whereby the constructed dental model is produced using a subtractive manufacturing method, such as a CAM machine, or using an additive manufacturing method, such as a 3D printer.

BRIEF DESCRIPTION OF THE DRAWINGS

The invention will be explained with reference to the drawings. The drawings show.

DETAILED DESCRIPTION OF THE INVENTION

Figure 1:
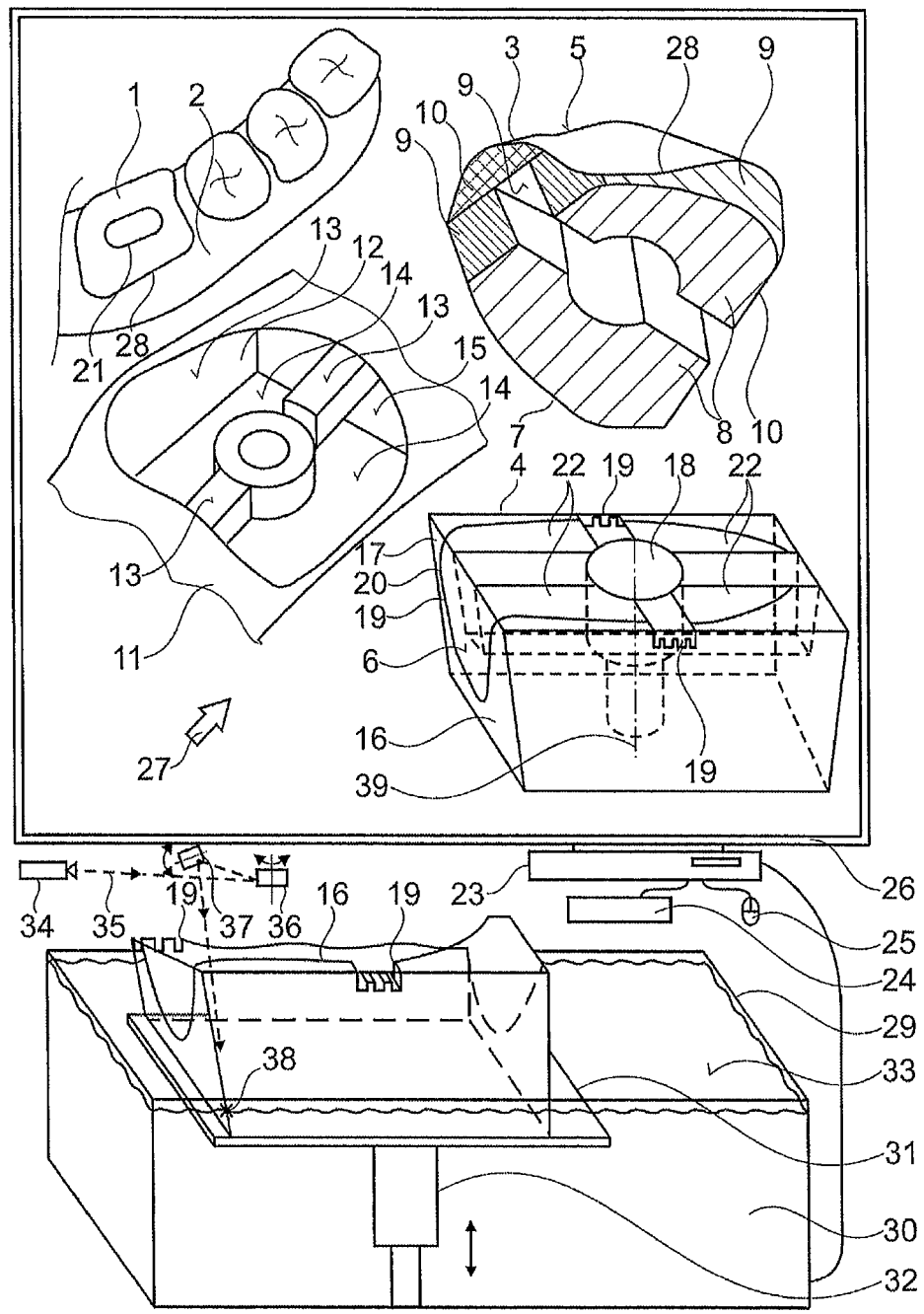
FIG. 1 a sketch for clarifying the method for producing an artificial gingiva, FIG. 2, 3 sketches of various cross-sectional views of the dental model; the FIG. 4-10 Sketches of various cross-sectional views of the gingiva template.

FIG. 1 shows a sketch to clarify the method for producing an artificial gingiva 1 for a dental model 2, wherein a 3D model 3 of the artificial gingiva 1 is at least partially constructed. A gingiva template 4 which, for example, depicts visible surfaces 5 of the 3D model 3 as a negative mold in the form of surfaces 6 is constructed using the 3D model 3 of the artificial gingiva 1. The 3D model 3 of the artificial gingiva comprises an internal structure 7, which consists of at least one non-critical surface 8, at least one bearing surface 9 and/or an undercut surface 10. The remainder of the 3D model 3 of the artificial gingiva 1 is defined by the visible surface 5. A 3D model 11 of the dental model 2 is then constructed, whereby the dental model 2 comprises an internal structure 12, which is configured at least partially as a negative mold of the internal structure 7 of the 3D model 3 of the artificial gingiva 1. The internal structure 12 of the 3D model 11 of the dental model 2 comprises at least one bearing surface 13, at least one non-critical surface 14 and/or at least one undercut surface 15. Therefore, when the artificial gingiva 1 is inserted into dental model 2, the bearing surfaces 9 of the artificial gingiva 1 come into contact with the bearing surfaces 13 of the internal structure 12 of the dental model 2, whereby the non-critical surfaces 8 of the artificial gingiva 1 are disposed at a distance from the non-critical surfaces 14 of the dental model 2. The undercut surface 10 of the artificial gingiva 1 therefore comes into contact with the undercut surface 15 of dental model 2, whereby the elastic artificial gingiva 1 is deformed in such a way that it fits into the non-elastic internal structure 12 of the dental model. In the embodiment shown, the gingiva template 4 is constructed of a first part 16, a second part 17 and a third part 18. The individual parts 16, 17 and 18 can be connected to one another using connecting means 19, such as plug connections. The second part 17 is constructed to be separable from the first part 16, so that the cured artificial gingiva 1 can be removed from the gingiva template 4 despite an undercut surface 20. The third part 18 is provided to produce an implant recess 21 for an implant analog. The hatched non-critical surfaces 22 are used as injection channels for injecting silicone. This makes it easier for the user to reach the corners of the gingiva template 4 with the silicone syringe, thus preventing the formation of air bubbles. The construction of the 3D model 3 of the artificial gingiva 1, the 3D model 11 of the dental model 2 and the construction of the gingiva template 4 is carried out virtually by a user or fully automatically using a computer 23, to which input means such as a keyboard 24 and a mouse 25 are connected. A display device 26, such as a monitor for graphically displaying and processing the 3D models, is connected to the computer 23 as well. The user can process the 3D model 3 of the artificial gingiva 1, 3D model 11 of the dental model 2, and the 3D model of the gingiva template to construct said models using input means 24 and 25 and a cursor 27. The construction can also take place fully automatically, whereby predefined criteria concerning the structure of the internal structure 7 of the artificial gingiva 1 and the internal structure 12 of the dental model 2 are taken into account. In the case of automatic construction, an edge line 28 of the artificial gingiva 1, and thus of the 3D model 3, and the shape of the visible surface 5 can be used as input data, for example. Subsequently, the undercut surfaces 10 of the internal structure 7 and the internal structure 12 are defined. The undercut surfaces serve to anchor the elastically deformable artificial gingiva 1, so that it does not fall out of the dental model 2. In the second step, the bearing surfaces 9 of the artificial gingiva 1 and thus the bearing surfaces 13 of the internal structure 12 of the dental model 2 are defined. The non-critical surfaces 8 are defined in the third step. The individual parts 16, 17 and 18 can be produced using a 3D printer 29, whereby the 3D printer is accordingly controlled by the computer 23. FIG. 1 shows that the first part 16 of the gingiva template 4 is printed by means of the 3D printer 29. Automatic production can also be performed using a CAM machine. In the embodiment shown, the 3D printer is based on an SLS method. The 3D printer is filled with the used material 30. The material 30 can be a paste, a mass, a powder, or a liquid consisting of particles of the used material. The first part 16 is printed by means of the 3D printer, in which a platform 31 is lowered layer by layer using an adjustment means 32. For each layer, the surface 33 of the used material 30 is scanned point by point. A laser 34 emits a laser beam 35, whereby the laser beam 35 is deflected by means of a first adjustable deflecting mirror 36 and a second adjustable deflecting mirror 37 and focused on a focal point 38. At the focal point 38, the high temperature of the incident laser beam 35 leads to a fusion of the particles of the material 30. The deflecting mirrors 36 and 37 are controlled by a control unit of the 3D printer 29 such that the desired layers of the object are scanned. After printing one layer, the platform 31 is lowered and the next layer is printed. The entire part 16 is thus printed layer by layer. The second part 17 and the third part 18 of the gingiva template 4 are subsequently printed as well.

The individual parts 16, 17 and 18 are then assembled, whereby the gingiva material, such as silicone, is injected into the gingiva template 4 and cured. The excess material of the cured artificial gingiva 1 is then trimmed off at the non-critical surfaces 22. The cured artificial gingiva 1 is subsequently removed from the gingiva template 4. The dental model 2 can likewise be printed according to the 3D model 11 using the 3D printer 29. The produced artificial gingiva 1 is then inserted into the printed dental model 2.

The undercut surface 20 is defined relative to an insertion direction 39 of the 3D model 3 of the artificial gingiva 1 to be produced or the gingiva template 4. The insertion direction 39 can coincide with the axis of symmetry of the cylindrical implant recess 21, for example.

FIG. 2 shows a sketch of a cross-sectional view of the dental model 2 and an artificial gingiva 1 inserted into it, with a distance 40 between the non-critical surfaces 8 of the artificial gingiva 1 and the non-critical surfaces 14. The bearing surface 9 and the undercut surface 10 of the artificial gingiva 1 are shown as well. FIG. 2 shows a first sectional plane A and a second sectional plane B.

FIG. 3 shows a cross-sectional view of the dental model 2 and the artificial gingiva 1 in the sectional plane A of FIG. 2, whereby FIG. 3 also shows a third sectional plane C in the longitudinal direction of the dental model 2.

FIG. 4 shows a first variation of a gingiva template 4 consisting of a first part 50, a second part 51 for the undercut surface 52 for producing the undercut surface 10 of the artificial gingiva 1 and a third part 53 for producing the implant recess 21 in a cross-sectional view through the sectional plane A of FIG. 2. The bearing surfaces 54 of the gingiva template 4 are shown in FIG. 4 as well.

FIG. 5 shows the gingiva template 4 consisting of the parts 50, 51 and 53 in a cross-sectional view through the sectional plane B of FIG. 2.

FIG. 6 shows the gingiva template 4 in a cross-sectional view through the sectional plane C of FIG. 3, whereby the third part 53 comprises a bar 60 for producing the bearing surfaces 9 of the artificial gingiva 1.

The silicone is injected into the gingiva template 4 through the non-critical surfaces 22, as shown in FIG. 4 and FIG. 5.

FIG. 7 shows a second variant of the gingiva template consisting of a first part 50, a second part 51 and a third part 53, whereby, unlike FIG. 4, the connecting means 19 are disposed between the first part 50 and the third part 53 and between the second part 51 and the third part 53. FIG. 7 is a cross-sectional view along the sectional plane A of FIG. 2.

FIG. 8 is a cross-sectional view of the gingiva template along the sectional plane B of FIG. 2.

FIG. 9 shows a cross-sectional view of the gingiva template 4 along the sectional plane B of FIG. 3.

FIG. 10 shows a sketch of a further embodiment, in which the gingiva template 4 consists of only one part and is placed directly onto the produced dental model 2, whereby the one-piece gingiva template 4 comprises two injection channels 70 for injecting the silicone. The artificial gingiva 1 is thus produced directly by injecting the silicone through the injection channels 70 into the spaces between the gingiva template 4 and the internal structure 12 of the dental model 2.

REFERENCE SIGNS

1 Gingiva
2 Dental model 3 3D model
4 Gingiva template
5 Surface areas
6 Surfaces
7 Internal structure
8 Non-critical surface
9 Bearing surface
10 Undercut surface
11 3D model
12 Internal structure
13 Bearing surface
14 Non-critical surface
15 Undercut surface
16 First part
17 Second part
18 Third part
19 Connecting means
20 Undercut surface
21 Implant recess
22 Non-critical surface
23 Computer
24 Keyboard
25 Mouse
26 Display device
27 Cursor
28 Edge line
29 3D printer
30 Material
31 Platform
32 Adjustment means
33 Surface area
34 Laser
35 Laser beam
36 Deflecting mirror
37 Deflecting mirror
38 Focal point
39 Insertion direction
40 Distance
50 First part
51 Second part
53 Third part
54 Bearing surfaces for the gingiva template
60 Bars
70 Injection channels

The invention claimed is:

1. Method for producing an artificial gingiva, in which a 3D model of the artificial gingiva is already provided, wherein the method comprises the steps of:
constructing a gingiva template representing at least partial areas of the 3D model of the artificial gingiva as a negative mold using the 3D model of the artificial gingiva,
wherein the gingiva template is constructed from at least two parts,
wherein the at least two parts of the gingiva template are constructed in such a way to connect to one another using a connecting means, and
wherein a dental model having a corresponding internal structure for inserting the artificial gingiva is constructed manually by a user or fully automatically using a computer, wherein the constructed dental model is produced using a subtractive manufacturing method or using an additive manufacturing method.

2. Method according to claim 1, wherein the artificial gingiva to be produced comprises at least one implant recess for at least one implant analog.

3. Method according to claim 1, wherein different surfaces are constructed in the construction of the gingiva template, bearing surfaces and undercut surfaces.

4. Method according to claim 2, wherein at least one additional, separable part of the at least two parts of the gingiva template is constructed for each undercut surface.

5. Method according to claim 2, wherein an additional separable part of the at least two parts of the gingiva template is constructed for each implant recess of the artificial gingiva to be produced.

6. Method according to claim 3, wherein the gingiva template is constructed manually by a user using a computer, and wherein the method further comprises the step of defining at least one non-critical surface, at least one undercut surface relative to an insertion direction of the artificial gingiva to be produced and/or at least one bearing surface.

7. Method according to claim 3, wherein the gingiva template is constructed fully automatically using a computer, and wherein the method further comprises the step of defining at least one non-critical surface, at least one undercut surface relative to an insertion direction of the artificial gingiva to be produced and/or at least one bearing surface.

8. Method according to claim 6 or 7, wherein the at least one non-critical surface of the gingiva template to be produced is used as an injection channel for injecting a gingiva material.

9. Method according to claim 1, wherein at least one part of the at least two parts of the constructed gingiva template is produced using a subtractive manufacturing method or using an additive manufacturing method.

10. Method according to claim 1, wherein a gingiva material that includes silicone, is introduced into the produced gingiva template and cured to form a cured artificial gingival.

11. Method according to claim 10, wherein excess material of the cured artificial gingiva in at least one injection channel is trimmed off the cured artificial gingiva manually or automatically using a cutting device.

12. Method according to claim 11, wherein the cured artificial gingiva is removed from the gingiva template.

* * * * *